March 16, 1948.                J. R. WRATHALL                    2,438,026
                                  DYNAMOMETER
                               Filed May 1, 1943
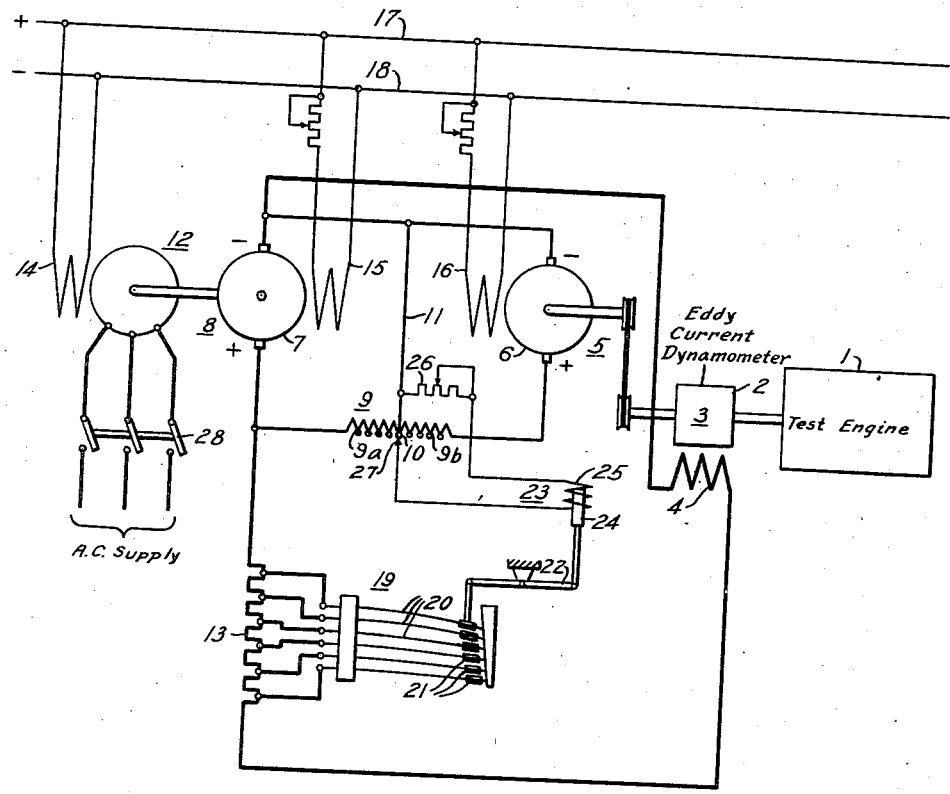
WITNESSES:                                                        INVENTOR
                                                               Jay R. Wrathall.
                                                                      BY
                                                                  ATTORNEY Patented Mar. 16, 1948

2,438,026

UNITED STATES PATENT OFFICE 2,438,026

DYNAMOMETER

Jay R. Wrathall, Pittsburgh, Pa., assignor to Westinghouse Electric Corporation, East Pittsburgh, Pa., a corporation of Pennsylvania Application May 1, 1943, Serial No. 485,282

8 Claims. (Cl. 73—134)

This invention relates to dynamometers and more particularly to a control system for regulating or controlling the power absorbing capacity of a load or power absorbing dynamometer or generator.

The use of a direct current dynamo mounted in the cradle of a dynamometer for the purpose of either driving or loading an engine to be tested is well known. Such dynamos are commonly employed in combination with dynamometers of the eddy current inductor type since the load which can be provided by the direct current dynamo is limited. The dynamo is usually operated as a motor for cranking the engine being tested, and to run tests on the engine at various speeds. After the engine has been started and is operating under its own power the dynamo is operated as a generator driven by the engine for the purpose of loading the engine being tested. Ordinarily the dynamo provides but a portion of the load on the test engine, the remainder of the load being supplied by the eddy current dynamometer.

In testing prime movers or engines, for example, those of the type commonly employed in aircraft, it is ordinarily required that tests be made maintaining a constant engine speed with varying torque and others requiring constant torque with varying engine speed. Such tests are, of course, more expeditiously and accurately conducted with apparatus requiring a minimum change in setup to perform in the manner required.

While the direct current dynamo commonly employed with the eddy current dynamometer absorbs a portion of the power output of the prime mover being tested, it may be considered as functioning independently from a control point of view with respect to the present invention and the direct current dynamo together with the control system therefor, for the purpose of simplicity, are not included in the present disclosure. It should be noted at this point however that when such means as a direct current dynamo coupled to the test engine are used in a dynamometer system of the character hereinafter described some means for regulating the load taken up by the direct current dynamo with increasing speeds must be had. Otherwise, in view of the different response characteristics of the dynamometer and the direct current dynamo, the dynamo may assume larger portions of the load as the speed increases than its capacity warrants. Such regulating means are described in a copending application of Jay R. Wrathall and Russell L. Findley, Serial No. 484,540, filed April 26, 1943, entitled Dynamometer, now Patent Number 2,394,131.

A principal object of this invention is to provide an improved control system for a dynamometer in dynamometer apparatus which will be simple in design and operation and effective to selectively control the operation of the dynamometer as required by predetermined load conditions.

Another object is to provide an improved control system for a dynamometer which is responsive to slight changes in speed to effect a substantially constant speed of the dynamometer.

A further object of the present invention is to provide a control system for a dynamometer in which a direct current generator having an output which varies with the speed of the dynamometer is used to regulate the speed thereof to a substantially constant value.

A specific object of the present invention is to provide a control system for a dynamometer used in testing prime-movers which may be selectively adjusted to automatically control the dynamometer to maintain the speed of the prime mover substantially constant with varying torques or to control the dynamometer to maintain the torque substantially constant while the speed varies.

Other objects and advantages of this invention will become apparent from a study of the following specification when considered in conjunction with the accompanying drawing in which the single figure diagrammatically illustrates a dynamometer and control devices therefor constructed in accordance with the principles of this invention.

Referring to the drawing, the numeral 1 designates a prime mover or engine to be tested which may be an internal combustion engine or other form of power plant for producing power. As shown the test engine is connected to the rotor 2 of an eddy current generator or dynamometer 3 which is provided with a control field winding 4. The control field winding 4 is in the stator of the dynamometer 3. The stator and rotor of the dynamometer 3 are made of iron in which eddy currents are induced upon energization of the control winding 4 and a braking force on the engine being tested will thus be produced. The construction and operation of eddy current dynamometers of this type are well known and the details of the dynamometer 3 are not shown herein in the interest of simplicity since they form no part of the present invention. However, it may be mentioned that the stator of the dynamometer usually is mounted in a cradle and connected to a scale beam or other form of torque indicating apparatus.

The amount of retarding effort or load applied to the engine being tested by the dynamometer 3 is determined by the degree of energization of the control field 4. Thus if it is desired to maintain the torque output of the engine substantially constant while the speed is varied the control field is energized to some predetermined value to provide the constant desired retarding torque. Under this condition if the power output of the engine increases the engine and dynamometer will increase in speed. If it is desired to maintain a constant engine speed with varying torque the energization of the field 4 must be controlled to increase or decrease as the torque increases or decreases thus varying the flux linkage of the rotor with the stator of the dynamometer as required, to maintain a substantially constant speed.

To this end a direct-current generator 5 is mechanically or otherwise suitably coupled to be rotated with the rotor 2 of the eddy current dynamometer 3. Its armature 6 and the armature 7 of a second direct current generator 8 have respectively connected thereacross the portions 9b and 9a, of the potentiometer 9 formed by the center tap 10. This is accomplished by connecting the potentiometer extremities to points of like polarity on the generators and connecting the center tap 10 by means of conductor 11 common to both generators to the other side of the generators. The direct current generator 8, is driven at a constant speed by means of the alternating current synchronous machine 12 and thus generates a constant direct potential which in addition to being applied across the portion 9a of the potentiometer 9 also supplies the control field 4 of the dynamometer 3 through field energization control resistor 13. The field winding 14 of the alternating current synchronous machine 12, field winding 15 of the constant potential direct current generator 8 and field winding 16 of the variable potential direct current generator 5 are all provided with excitation from a constant source of direct potential indicated by the conductors 17 and 18.

Suitable control of the field winding of the dynamometer 3 is obtained by properly shunting portions of the field control resistor 13. This is accomplished by means of a "silverstat" 19 which comprises a plurality of insulatedly spaced and supported flexible conductors 20 carrying normally open silver contact members at their free ends, hence the term "silverstat." Each of these flexible conductors 20 at their stationary ends are connected to spaced taps on the field control resistor 13 such that pivotal movement of an actuating arm 22 into the flexible conductors progressively engages the contacts 21 to progressively shunt the associated tapped portions of the resistor 13.

Pivotal movements of the actuating arm 22 are effected by a solenoid 23 having a movable core 24 and a coil 25. One side of the coil 25 is connected to the conductor 11 through the vernier resistor 26 and thus to the center tap 10 of the potentiometer 9, and the other side is slidably adjustable by means of a potentiometer slider 27 along the potentiometer from the center tap 10 to any predetermined position on either portion 9a or 9b.

For descriptive purposes the center tap 10 of the potentiometer may be considered a point of zero potential. As previously mentioned the potentiometer 9 has the potential of the constant potential generator 8 applied across the portion 9a thereof and the potential of the variable potential generator 5 applied across the portion 9b thereof. It will now readily be seen if the potentiometer slider 27 is positioned at the point of the center tap 10 on the potentiometer the voltages of both sides of the coil 25 are equal and hence no current will flow. If however the slider 27 is moved along either portion 9a or 9b of the potentiometer a voltage will appear across the coil proportional to the voltage drop across the shunted portion of 9a or 9b. In this manner if the slider 27 is positioned on potentiometer portion 9a the coil 25 will be energized by a constant potential supplied only by the generator 8 of a constant value indicated by the position of the slider 27 and if positioned on portion 9b will be energized by a variable potential supplied only by the generator 5. Adjustments may therefore be made to provide a suitable electromagnetic bias on the core 24 of the solenoid to shunt the necessary portions of the resistor 13 to produce the desired value of excitation of the field 4, and this value may be selectively controlled to be some constant value or some range of variable values.

The operation of the dynamometer apparatus may best be understood by considering each of the tests which are to be made upon the engine, namely the operation of the engine at constant speed while the torque is varied and the operation of the engine at variable speed with constant torque. Considering the first mentioned test and assuming the engine on test to have been started by some external starting means as, for example, the direct current dynamo mentioned in the statement of objects of this specification, the switch 28 connecting the alternating current synchronous machine 12 to the line is closed thus rotating the armature of the direct current generator 8 at a constant speed and generating a constant potential. This constant potential is applied across potentiometer portion 9a and with the potentiometer slider 27 at its preferred zero setting during starting, the potential of generator 8 less the voltage drop of the whole of resistor 13 is applied across the control field of winding 4. The generator 5 is also generating a potential as a result of its connection with the eddy current, dynamometer 3 now being driven by the engine. This generated potential varies with and is proportional to the speed of rotation of the test engine and is applied across the potentiometer portion 9b.

Since in the first mentioned engine test it is desired to maintain the speed of the test engine constant with increasing or decreasing power output, the potentiometer slider is moved to the right to some predetermined position on potentiometer portion 9b. The drop across the shunted portion of 9b energizes the solenoid coil 25 in an amount proportional to the speed of the test engine and pulls the core 24 up until the electromagnetic force on the core is balanced by the bias of the deflected silverstat conductors thus shunting a portion of the resistor 13 which increases the strength of the field 4 and pulls the speed of the engine down to or slightly below the desired value. As the power output of the ingine is increased the speed also tends to increase with a corresponding increase in the potential applied across potentiometer portion 9b which by reason of the increased electromagnetic force on the core 24 shunts more of the resistor 13 to increase the strength of the control field winding 4 and produce a greater retarding effort of the eddy current dynamometer 3 to hold the speed substantially constant. If the power output of the test engine is decreased the converse of the above described operation takes place to weaken the strength of field 4 and to hold the average speed constant with decreasing torque and power.

To conduct the second mentioned test on the engine, that is, allowing the speed to vary while the torque is held constant, it is only necessary to move the potentiometer slider 27 to the left to some predetermined setting on the portion 9a. In this position energization of the coil 25 is no longer effected by the drop across portion 9b but only by the drop across the shunted part of the portion 9a of the potentiometer. Since the voltage drop across the portion 9a is constant, as previously explained, for any setting of the slider 27, a fixed electromagnetic pull is exerted upon the solenoid core 24, to energize the field 4 to the extent determined by the potentiometer setting. The speed of the engine may now increase or decrease with varying power adjustment of the test engine but the retarding effort or load placed by the dynamometer on the test engine does not vary in view of the fixed excitation of the field 4. Thus the torque output of the test engine will be held substantially constant while the speed thereof varies with varying power.

From the foregoing it will now be seen that applicant has provided a greatly simplified form of dynamometer control system which functions effectively to selectively hold either engine speed or engine torque substantially constant and which by means of the convenient potentiometer adjustment eliminates any necessity for rearranging the circuits or apparatus when changing from one test to another.

Since numerous changes may be made in the dynamometer control system herein described and different embodiments of the invention may be made without departing from the spirit and scope, it is intended that all the matter contained in the foregoing description or shown in the accompanying drawing shall be interpreted as illustrative and not in a limiting sense.

I claim as my invention:

1. Apparatus for testing a prime mover comprising, in combination, an eddy current dynamometer and a control field winding for said dynamometer, a source of constant direct potential permanently connected to said control field winding for energizing said control field winding, a source of direct potential variable in response to the speed of rotation of said dynamometer, electrical regulating means disposed in circuit relation with said control field winding and said source of constant direct potential and means including an electromagnetic device which is responsive to said source of variable direct potential for controlling said electrical regulating means.

2. Apparatus for testing a prime mover comprising in combination an eddy current dynamometer and a control field winding for said dynamometer, a source of constant direct potential permanently connected to said control field winding for energizing said control field winding, a source of direct potential variable in response to the speed of rotation of said prime mover, electrical regulating means disposed in circuit relation with said control field winding and said source of constant direct potential and means selectively responsive to said source of constant direct potential and said source of variable direct potential for controlling said electrical regulating means.

3. Apparatus for testing a prime mover comprising in combination, an eddy current dynamometer having a control field winding and a rotor coupled to rotate with said prime mover, a source of constant direct potential for energizing said field winding, a source of direct potential having an output value which varies with the speed of rotation of said dynamometer, a resistor in series with said control field winding, and control means for shunting portions of said resistor, said control means being selectively responsive to each of said sources of direct potential for controlling the excitation of said control field winding.

4. Apparatus for testing a prime mover comprising, in combination, an eddy current dynamometer having a control field winding and a rotor coupled to rotate with said prime mover, a constant voltage direct current generator for energizing said control field winding, a direct current generator having a voltage output which varies with the speed of rotation of said dynamometer, a resistor in series with said control field winding, and means selectively responsive to the voltage output of each of said generators for progressively shunting portions of said resistor.

5. Apparatus for testing a prime mover comprising, in combination, an eddy current dynamometer having a control field winding and a rotor coupled to rotate with said prime mover, a constant voltage direct current generator for energizing said control field winding, a direct current generator having a voltage output which varies with the speed of rotation of said dynamometer, a center tapped potentiometer having one half thereof connected across said constant voltage generator and the other half thereof connected across said variable voltage generator, a resistor in series with said control field winding, and control means for shunting portions of said resistor electrically connected to said potentiometer whereby said control field winding may be selectively controlled by said constant voltage generator and said variable voltage generator.

6. Apparatus for testing a prime mover comprising, in combination, an eddy current dynamometer having a control field winding and a rotor coupled to rotate with said prime mover, a constant voltage direct current generator for energizing said field winding, a second direct current generator coupled to said dynamometer having a voltage output proportional to the speed of rotation of said dynamometer, a center tapped potentiometer having one half thereof connected across said constant voltage generator and the other half thereof connected across said variable voltage generator, a resistor connected in series with said control field winding, a plurality of flexible contact carrying conductors connected along spaced taps of said resistor adapted to progressively shunt portions of said resistor upon engagement of said contacts, electromagnetic means operable to deflect said conductors and engage said contacts in an amount corresponding to the energization thereof, and manually adjustable circuit means electrically connecting said electromagnetic means to said potentiometer whereby said electromagnetic means may be controlled to effect control of said control field winding selectively by said constant voltage generator and by said variable voltage generator.

7. In testing apparatus, an electric dynamometer for connection to a device to be tested, said dynamometer comprising a rotor and a control field winding, a source of constant potential for energizing said control field winding, a source of potential having a value which varies with the speed of rotation of said dynamometer, and control means selectively responsive to each of said sources of potential for controlling the energization of said control field winding by said source of constant potential, whereby said dynamometer may be operated with a fixed value of energization of the control field thereof for maintaining a constant load on said device and may be operated with a variable energization of the control field thereof for maintaining a substantially constant speed of rotation of said device.

8. In testing apparatus, an electric dynamometer for connection to a device to be tested, said dynamometer comprising a rotor and a control field winding, a constant voltage generator for energizing said control field winding, a second generator having a voltage output which varies with the speed of rotation of said dynamometer, a center tapped potentiometer having one half thereof connected across said constant voltage generator and the other half thereof connected across said variable voltage generator, and control means for said control field winding connected to said potentiometer whereby said dynamometer may be operated with a fixed value of field energization for maintaining a constant load on said device and may be operated with a value of field energization which varies with slight variations of the speed of rotation of said dynamometer for maintaining said device at a substantially constant speed.

JAY R. WRATHALL.

REFERENCES CITED

The following references are of record in the file of this patent:

UNITED STATES PATENTS

| Number | Name | Date |
|---|---|---|
| 1,789,146 | Livingston | Jan. 13, 1931 |
| 1,966,245 | Harvey | July 10, 1934 |
| 2,011,655 | Schaelchlin et al. | Aug. 20, 1935 |
| 2,220,007 | Winther et al. | Oct. 29, 1940 |
| 2,241,811 | Exner | May 13, 1941 |
| 2,285,195 | Edwards | June 2, 1942 |
| 2,298,076 | Whiting | Oct. 6, 1942 |
| 2,298,894 | McDougal | Oct. 27, 1942 |
| 2,300,163 | McDougal | Oct. 27, 1942 |
| 2,300,960 | Porter | Nov. 3, 1942 |
| 2,335,860 | Kaufmann | Dec. 7, 1943 |